(12) United States Patent
DeBates et al.

(10) Patent No.: US 10,222,464 B2
(45) Date of Patent: Mar. 5, 2019

(54) LOW POWER WIRELESS RFID BASED SENSORY SYSTEM FOR VEHICLE NAVIGATION

(71) Applicant: Motorola Mobility LLC, Chicago, IL (US)

(72) Inventors: Scott Patrick DeBates, Crystal Lake, IL (US); Douglas Lautner, Round Lake, IL (US); Jagatkumar Shah, Lake in the hills, IL (US); Mary Hor-Lao, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 104 days.

(21) Appl. No.: 15/625,457

(22) Filed: Jun. 16, 2017

(65) Prior Publication Data
US 2018/0364347 A1    Dec. 20, 2018

(51) Int. Cl.
| H04W 24/00 | (2009.01) |
| G01S 13/76 | (2006.01) |
| B62D 15/02 | (2006.01) |
| G01S 19/13 | (2010.01) |
| G01C 21/20 | (2006.01) |
| G01C 21/10 | (2006.01) |

(52) U.S. Cl.
CPC .......... G01S 13/767 (2013.01); B62D 15/024 (2013.01); G01C 21/10 (2013.01); G01C 21/20 (2013.01); G01S 19/13 (2013.01)

(58) Field of Classification Search
CPC ....... G01S 13/767; G01S 19/13; G01C 21/10; G01C 21/20; B62D 15/024
USPC ...................................... 455/456.1
See application file for complete search history.

(56) References Cited

U.S. PATENT DOCUMENTS

| 7,015,802 B2* | 3/2006 | Forster ............... B60C 23/0408 116/34 R |
| 2008/0127723 A1* | 6/2008 | Lin ..................... B60C 23/0416 73/146.4 |
| 2017/0297619 A1* | 10/2017 | Lavoie .................. B62D 6/002 |
| 2017/0364090 A1* | 12/2017 | Grufman .............. G05D 1/0214 |

* cited by examiner

Primary Examiner — Amancio Gonzalez
(74) Attorney, Agent, or Firm — Miller, Matthias & Hull LLP (57) ABSTRACT

Systems and methods for monitoring a vehicle location and orientation use initial location and orientation data in combination with one or more past calculated vehicle speeds and steering angles. A near field radio frequency (RF) transmission is periodically emitted and is receivable by one or more antennas embedded in one or more tires of the vehicle. One or more responsive RF transmissions are periodically received from respective ones of the one or more antennas embedded in the tires, and the vehicle speed and steering angle are periodically calculated based on the received RF transmissions. The current vehicle location and orientation are periodically calculated based on the initial location and orientation data and one or more past calculated vehicle speeds and steering angles.

20 Claims, 6 Drawing Sheets

LOW POWER WIRELESS RFID BASED SENSORY SYSTEM FOR VEHICLE NAVIGATION

TECHNICAL FIELD

The present disclosure is related generally to wireless communication and detection technologies, and, more particularly, to a system and method for providing vehicle navigation assistance via wireless sensors.

BACKGROUND

Among the many functions provided by networked electronic devices, navigational assistance for vehicle navigation has become increasingly popular. In particular, drivers and passengers often use their telecommunications device, a dedicated portable device or a built-in device to provide driving assistance while in a vehicle. Many such systems operate via GPS to determine the location of the user's vehicle.

However, GPS guidance is only usable where GPS signals can be and are being received. In locations where obscuration or interference renders GPS unusable, navigation assistance becomes unavailable for GPS-based systems. While inertial navigation systems can sometimes replace GPS-based navigation for short periods, such replacement facilities do not necessarily directly measure vehicle parameters, and as such are subject to increasingly drift and other problems as the period of use becomes extended.

Before proceeding, it should be appreciated that the present disclosure is directed to a system that can eliminate some of the shortcomings noted in this Background section. However, any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize any prior art reference or practice. As such, the inventors expressly disclaim this section as admitted or assumed prior art. Moreover, the identification herein of desirable courses of action reflects the inventors' own observations and ideas, and should not be assumed to indicate an art-recognized desirability.

SUMMARY

In an embodiment of the disclosed principles, a method is provided for monitoring a vehicle location and orientation. The method includes receiving initial location and orientation data and periodically emitting a near field radio frequency (RF) transmission receivable by one or more antennas embedded in one or more tires of the vehicle, the one or more antennas being associated with respective RF transmission circuitry. One or more responsive RF transmissions are periodically received from respective ones of the one or more antennas embedded in the tires, and the vehicle speed and steering angle are periodically calculated based on the received RF transmissions. The current vehicle location and orientation are periodically calculated based on the initial location and orientation data and one or more past calculated vehicle speeds and steering angles.

In another aspect of the disclosed principles, a system is provided for determining a position and orientation of a vehicle having a plurality of tires. The system includes an antenna system with one or more antennas embedded in one or more of the vehicle tires, each antenna being configured to emit a responsive RF signal when probed by an RF probe signal. A monitoring device includes an RF transceiver as well as a processor configured to determine an initial position and orientation of the vehicle, periodically emit a near field radio frequency transmission, periodically receive one or more responsive radio frequency transmissions from the one or more antennas, periodically calculating vehicle speed and steering angle based on the responsive radio frequency transmissions, and periodically determining the current vehicle location and orientation based on the initial location and orientation data and past calculated vehicle speeds and steering angles.

In another aspect of the disclosed principles, a device is provided for determining a position and orientation of a vehicle having a tire with at least one RFID antenna embedded therein. The device includes a radio frequency RF transceiver and an RF antenna linked to the RF transceiver. A processor of the device is configured to obtain data indicating an initial position and orientation, emit an RF probe signal from the RF antenna via the RF transceiver, the RF probe signal being receivable by the embedded RFID antenna, receive a responsive RF signal from the at least one embedded RFID antenna, determine a vehicle speed and steering direction based on the responsive RF signal, and determine a current position and orientation of the vehicle based on the initial position and orientation and the determined vehicle speed and steering direction.

Other features and aspects of the disclosed principles will be apparent from the detailed description taken in conjunction with the included figures, of which:

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, GPS-based navigation systems are subject to the availability and readability of GPS signals. However, GPS signals may become obscured by structures such as buildings or tunnels, and may also become unreadable in the presence of electromagnetic interference.

While inertial replacement systems may allow navigation by "dead-reckoning," inertial systems can experience drift and other sources of inaccuracy during periods of extended use. As such, while GPS provides a good general navigational aid, and while inertial systems provide a short-term back-up navigational aid, there is a lack of suitable navigation assistance solutions for long term non-GPS-based navigation.

In an embodiment of the disclosed principles, a self-referenced vehicle navigation system is provided that is accurate without requiring external reference, other than for initial position identification. To track vehicle components that affect vehicle location thereafter, the system includes internally-tracked RFID tags embedded in such components. The vehicle includes an RFID reader that energizes and reads the sensor data from the RFID tags, e.g., in each wheel or tire.

These tags may be referred to as accelerometer tags (indicating vehicle speed and acceleration), and gyroscope tags (indicating wheel steering angle). The system collects the tag data and integrates it to calculate distance and direction traveled. As noted above, the system is seeded with its first location, but thereafter the system uses the movement of the wheels to navigate in conjunction with any suitable road map software or database.

With this overview in mind, and turning now to a more detailed discussion in conjunction with the attached figures, the techniques of the present disclosure are illustrated as being implemented in a suitable computing environment. The following generalized device description is based on embodiments and examples within which the disclosed principles may be implemented, and should not be taken as limiting the claims with regard to alternative embodiments that are not explicitly described herein. Thus, for example, while FIG. 1 illustrates an example mobile device with respect to which embodiments of the disclosed principles may be implemented, it will be appreciated that other device types may be used, including but not limited to laptop computers, tablet computers, embedded automobile computing systems and so on.

Figure 1:
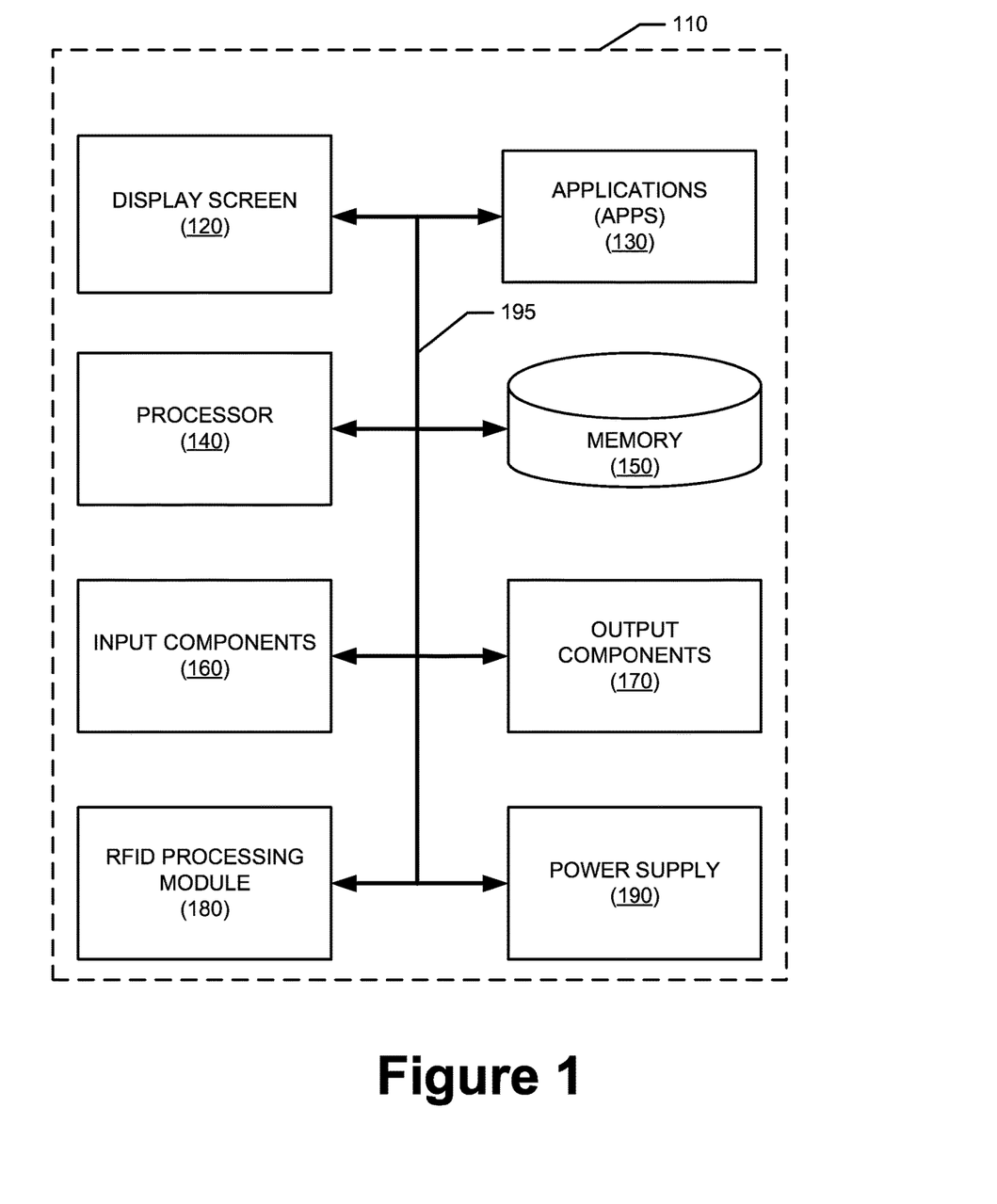
FIG. 1 is a simplified schematic of an example device with respect to which embodiments of the presently disclosed principles may be implemented.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities, including, for example one or more GPS receiving antennas and associated circuitry, and one or more output components 170 such as RF output facilities. It will be appreciated that a single transceiver and antenna may serve as both the output antenna and the receiving antenna. In addition, a gyroscope may also be included as one of the input components 160 as well.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device 110 also includes an RFID processing module 180 to control the sending and receipt of RFID signals for example, and to process the results. In an embodiment, a power supply 190, such as a battery or fuel cell, is included for providing power to the device 110 and its components. Additionally or alternatively, the device 110 may be externally powered, e.g., by a vehicle battery or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules (e.g., the RFID processing module 180) and execute programs for initiating different activities such as launching an application, transferring data and toggling through various graphical user interface objects (e.g., toggling through various display icons that are linked to executable applications). As noted above, the input components may include one or more GPS antennas and associated circuitry. Alternatively, the device 110 may receive GPS-based location data from an external source such as a user or another device.

Figure 2:
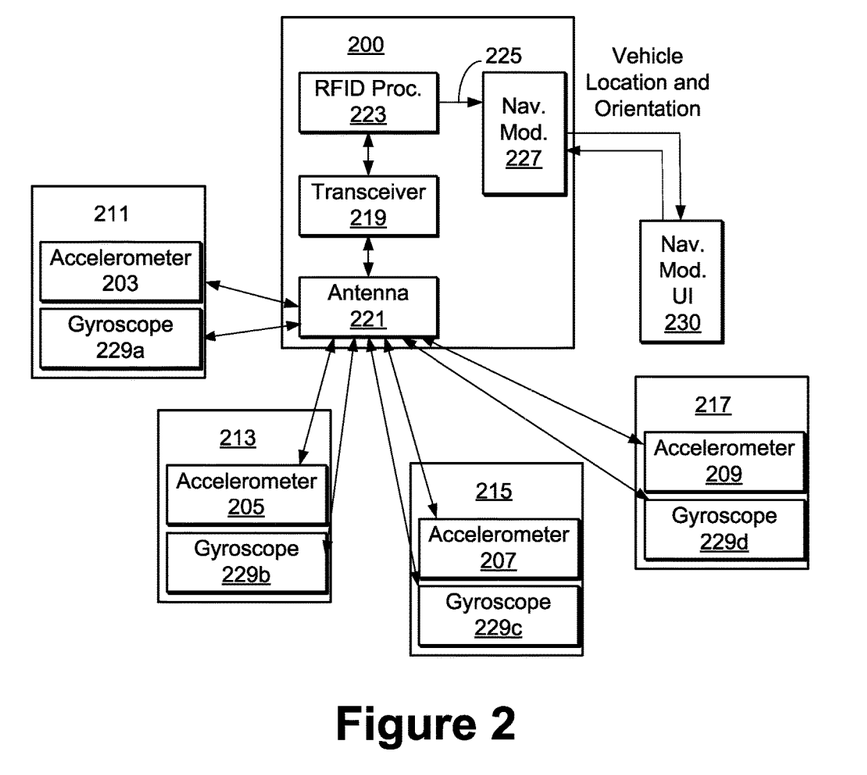
FIG. 2 is a device-level schematic showing an operating environment in accordance with an embodiment of the disclosed principles.

Turning to FIG. 2, this figure provides a device-level schematic showing an operating environment in accordance with an embodiment of the disclosed principles. As can be seen, a monitoring device 200, e.g., a device such as the device 110 shown in FIG. 1, is wirelessly associated with a plurality of embedded RFID antennas 203, 205, 207, 209, 229a-d. Each of the embedded RFID antennas 203, 205, 207, 209, 229a-d is associated with a vehicle tire 211, 213, 215, 217. Certain of the embedded RFID antennas 203, 205, 207, 209 are referred to as accelerometer antennas (or accelerometers) in that they are used to determine rotational rate, while others 229a-d are referred to as gyroscope antennas (or gyroscopes) in that they are used to determine wheel orientation.

In operation, a transceiver 219 of the monitoring device 200, using an antenna 221, transmits a periodic EMF pulse, coded or otherwise, of sufficient strength to activate the embedded RFID antennas 203, 205, 207, 209, 229a-d. These embedded RFID antennas 203, 205, 207, 209, 229a-d in turn emit a characteristic EMF transmission of sufficient strength to be received by the antenna 221 and interpreted by a transceiver 219.

In accordance with an aspect of the disclosed principles, the embedded RFID antennas 203, 205, 207, 209, 229a-d are located within their respective tires 211, 213, 215, 217 or wheels in a manner such that the returned signal for the associated embedded RFID antennas 203, 205, 207, 209, 229a-d of each tire 211, 213, 215, 217 can be used to identify the track and location of a portion of the tire. For example, as discussed above, a first set of RFID tags referred to as the accelerometer tags may span substantially the width of the tire and be positioned across the tire axially (from inside to outside) to aid in determining tracking, while an addition set of RFID tags may be positioned circumferentially in each tire to aid in determining rate of rotation.

During operation, as the associated vehicle travels, the return signals from the accelerometer and gyroscope RFID tags are processed to determine the speed and direction of the tags and thus of the associate tire. For example, in an embodiment, if the front tire gyroscope tags indicate a steering angle of 5° left and a speed of 20 mph, then the vehicle can be assumed to be moving at 20 mph in a 5° left.

The data from each of the respective gyroscopes 229a-229d of the wheels associated with the tires 211, 213, 215, 217 may serve to check and refine the calculated speed, while the data from the tags of the two front wheels can be used alone or checked against each other to check steering angle. In an embodiment, the steering angle given for each front tire may be averaged to generate a calculated steering angle for the vehicle or a certain wheel, e.g., the left wheel, right wheel, inside turn wheel or outside turn wheel may be assumed to indicate the most accurate steering angle for the vehicle.

The reason for selecting an average of the two wheel steering angle may be that the vehicle alignment configuration includes front wheel toe-in of the tires. Additionally, even without toe-in, the two front wheels may be at slightly different angles in a turn due to the fact that they trace circles of different radii. As noted above, the return signals from the circumferential tags are used in an embodiment to determine the rotational rate or surface speed of each tire.

An RFID processing module 223 of the monitoring device 200 is configured to interpret the received RF data, e.g., to perform the above-referenced calculations, to determine the speed and orientation of each tire or of a subset of the tires. For example, the RFID processing module 223 may calculate an orientation (steering angle) associated with the vehicle's front tires while calculating the rotational rate or surface speed for all tires or just the rear tires.

In an embodiment, the calculated steering angle and speed 225 are then used to track the vehicle direction and location, e.g., via turn-by-turn navigation. Turn-by-turn navigation, as that term is used herein, refers to integrating or adding up a series of vehicle maneuvers as a function of time to identify a current location and orientation. Thus for example, a vehicle initially going north at a speed of 60 mph will be located one mile directly north of its original position after travelling for 60 seconds at the same speed and with no deviations in the steering angle. A vehicle initially pointed north going 60 mph with a steering angle that yields a 5°/second turn rate counter-clockwise at that speed will be pointed due west after 18 seconds of travel, at th end of a 0.3 mile arc from the initial location.

In an embodiment, a navigation module 227 is used to track the vehicle position and orientation via turn-by-turn tracking of the vehicle's movements. The navigation module 227 may be integrated with the device 110 or may be a stand-alone device or a device integrated with another system such as a built-in vehicle navigation system. The navigation module 227 periodically provides a vehicle location and orientation update to a navigation module UI 230 for use in displaying the data to a user as well as receiving user instructions for destination selection, course changes, waypoint addition, and any other user requests associated with navigation assistance. As noted above, the navigation module 227 may work in conjunction with a mapping database for calculating directions and locations.

Figure 3:
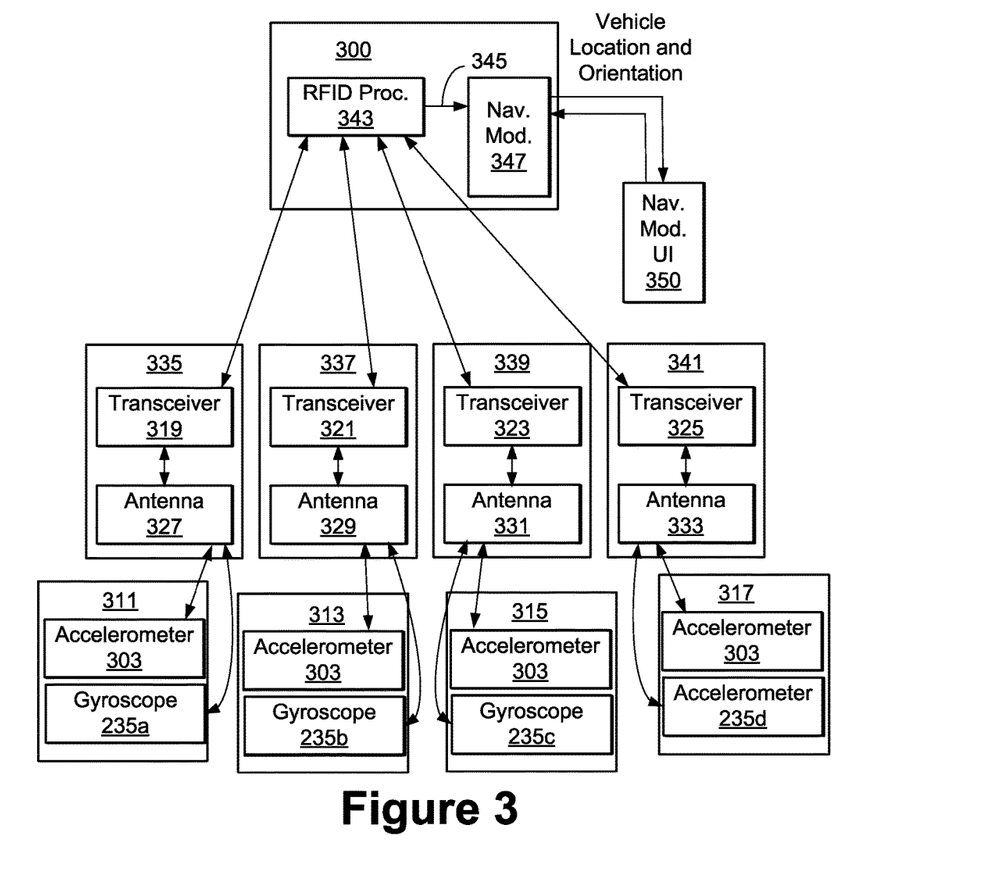
FIG. 3 is a device-level schematic showing an alternative operating environment in accordance with an embodiment of the disclosed principles.

In an alternative embodiment consistent with the disclosed principles, the monitoring of the embedded antennas may instead be distributed as shown in FIG. 3. This embodiment may be beneficial in contexts wherein the tires to be monitored are too far apart to enable RFID communications of all antennas with a single central device.

In this alternative embodiment, each tire 311, 313, 315, 317 includes one or more respective embedded RFID accelerometer antennas 303-309 and gyroscope antennas 235a-235d as in the prior embodiment. However, the system now includes a separate radio unit 335, 337, 339, 341 for each embedded RFID antenna 303-309 and 235a-235d. Typically, each radio unit 335, 337, 339, 341 will be located within short-range communication distance (e.g., within one or two feet) of the associated tire 311, 313, 315, 317 and its respective embedded RFID antenna 303-309 and 235a-235d.

A central device 300, which again may be a mobile telecommunications device such as device 110 or otherwise, e.g., a CAN (Car Area Network) controller or the like, receives data from the separate radio units 335, 337, 339, 341 at its RFID processor 343 and interprets the data as above to determine steering angle and speed 345. As with the embodiment shown in FIG. 2, the determined steering angle and speed 345 are provided as input to a navigation module 347.

The navigation module 347 periodically provides a vehicle location and orientation update to a navigation module UI 350 for use in displaying the data to a user as well as receiving user instructions as noted above. Again, the navigation module 347 may work in conjunction with a mapping database for calculating directions and locations.

Figure 4:
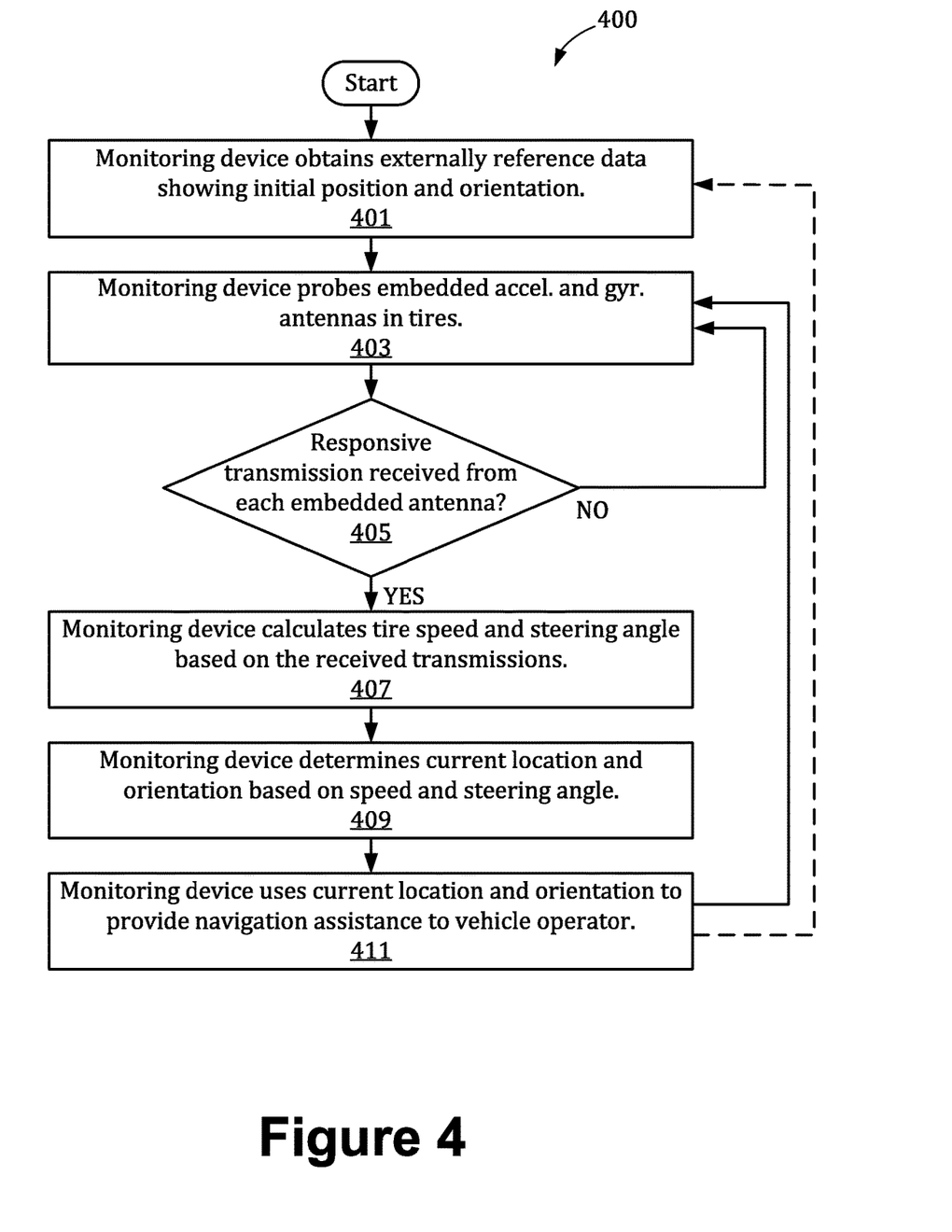
FIG. 4 is a flowchart of a process for gathering and interpreting RFID data in accordance with an embodiment of the disclosed principles.

FIG. 4 is a flowchart of a process 400 for gathering and interpreting RFID data in the context of providing navigation assistance to a vehicle operator. The system architecture in this example may be either of those shown in FIGS. 2 and 3, or otherwise.

At stage 401 of the process 400, the monitoring device determines an initial location and orientation of a vehicle by external reference, e.g., via GPS, user input, and so on. The monitoring device then at stage 403 causes a periodic ping or query to be transmitted to a plurality of embedded gyroscope and accelerometer RFID tags in a corresponding plurality of tires that are mounted and in use on the vehicle. At stage 405 of the process 400, the monitoring device determines whether a responsive transmission has been received from each embedded antenna. In order for the monitoring device to determine if a response has been received from each embedded antenna, it is helpful to be able to distinguish between responses received from different antennas, especially if centralized detection is employed as in FIG. 2. In this regard, the embedded antenna responses may be distinguished by any relevant characteristic, e.g., ID encoding, signal attenuation, differential TOF (time-of-flight) and so on.

If it is determined that responses have not been received from all embedded antennas then the process 400 returns to stage 403. If it is determined that responses have been received from all embedded antennas, then the process 400 continues to stage 407, wherein the monitoring device calculates the speed of one or more tires and the steering angle of one or more steering tires based on the received responsive transmissions.

At stage 409, the monitoring device determines a current vehicle location and orientation based on the calculated speed and steering angle, e.g., by integrating the current speed and steering angle into a past history of periodic speeds and steering angles. As those of skill in the art will appreciate, the current vehicle location and orientation are a result of all past speeds and steering angles being summed or integrated after the initial location and orientation determination. This is sometimes referred to as "dead reckoning."

Given the current vehicle location and orientation from stage 409, these values are then used at stage 411 to provide navigational assistance to the vehicle operator. For example, the current vehicle location and orientation may be used to show the vehicle iconically on a UI map and to provide directions for subsequent maneuvers to reach a destination. As noted above, the monitoring device may utilize a mapping database to determine the meaning of the current vehicle location and orientation, e.g., the road upon which the vehicle is travelling, the distance to and roads available to reach the desired destination and so on.

The monitoring device in the foregoing examples received an initial position and orientation and then calculated subsequent positions and orientations based on dead reckoning. It will be appreciated however, that this does not preclude, in every instance, receiving subsequent externally-referenced position and orientation data where available. In cases where such updates are received, they may be used to refine the calculated position and orientation and to calibrate the parameters used by the navigation module to calculate position and orientation. For example, such an update may disclose that the navigation module should assume greater slippage in turns, and the navigation module will be updated to reflect such refinements. In this way, the navigation module may learn and refine vehicle characteristics that have some bearing on dead reckoning calculations.

Figure 5:
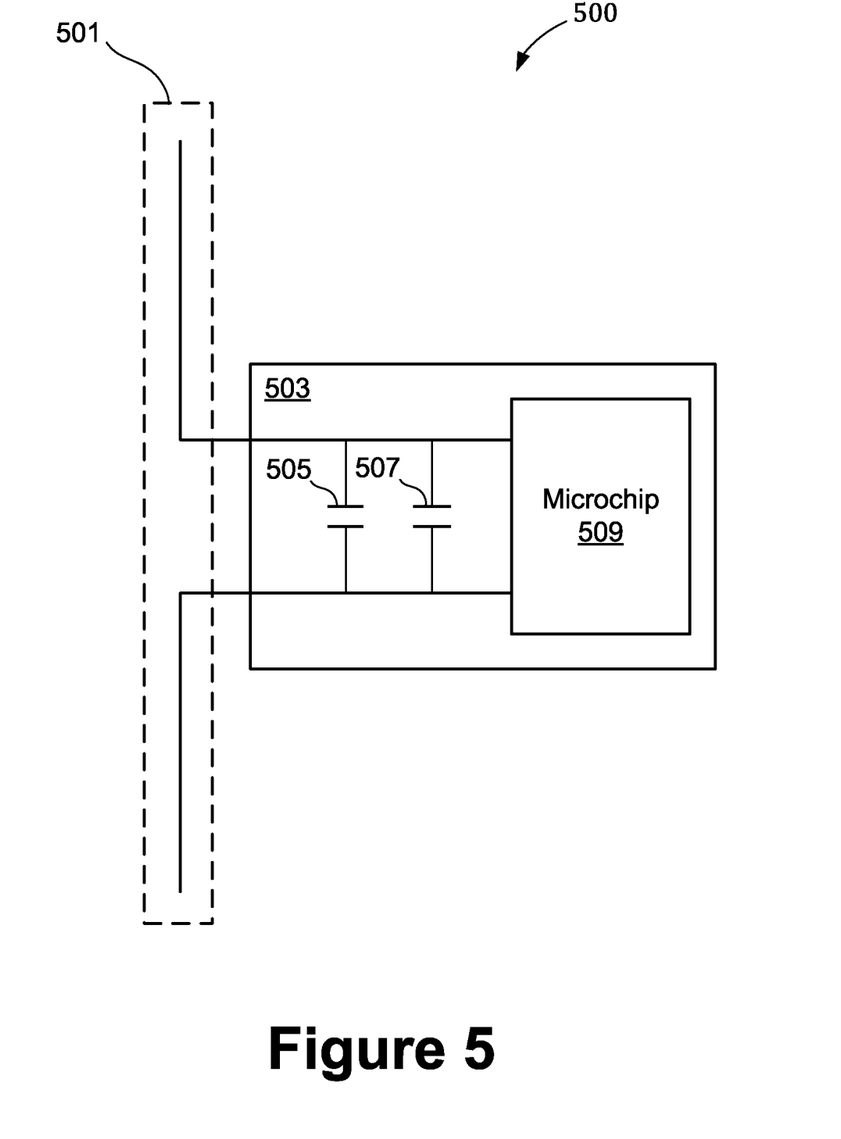
FIG. 5 is circuit diagram of an RFID tag antenna architecture usable in accordance with embodiments of the disclosed principles.

Although there are numerous different RFID antenna architectures in use, an example of one such configuration is shown in FIG. 5 for the sake of completeness. In particular, FIG. 5 is circuit diagram of a passive RFID tag antenna architecture usable in accordance with an embodiment of the disclosed principles. As can be seen, the circuit 500 includes an antenna 501 as well as a response portion 503. The response portion 503 of the circuit 500 contains one or more filtering capacitors 505, 507 as well as a microchip 509.

In operation, the receipt of an EMF signal at the antenna 501 induces a voltage in the response circuit 503. The voltage in the response circuit 503 is filtered by the one or more filtering capacitors 505, 507 before being provided to the microchip 509. The microchip 509, having been energized, emits a characteristic response for transmission by the antenna 501. In this way, the receipt of an EMF signal at the passive RFID tag causes the re-radiation of a signal that is characteristic of the particular passive RFID tag.

Figure 6:
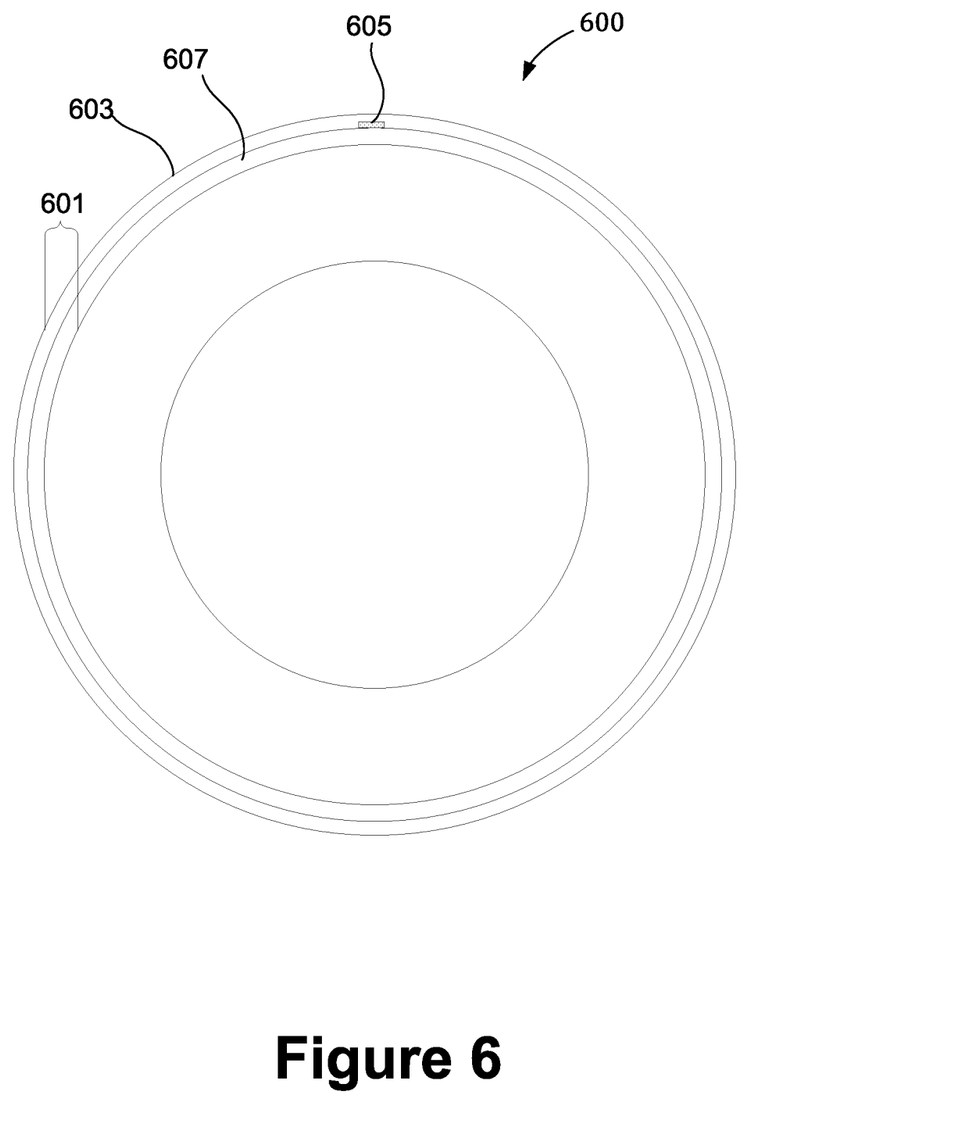
FIG. 6 is a schematic side view of a tire having RFID tags in keeping with an embodiment of the disclosed principles.

FIG. 6 is a sectional side view of a tire having multiple RFID tags in keeping with an embodiment of the disclosed principles. The illustrated tire 600 has a circumferential outer surface 601 bearing tire tread 603. Embedded within or beneath the tire tread 603 are multiple RFID tags comprising a first tag having a first antenna 605 and a second tag having a second antenna 607. In the illustrated embodiment, the first antenna 605 spans the width of the trade surface and as such is directed perpendicular to the plane of the page. The second antenna 607 wraps around the circumference of the tire 600 in the illustrated embodiment.

Thus, as the tire rotates, an adjacent RFID reader is able to track each antenna to provide speed and steering information. In an embodiment, however, a single circumferential tag is employed to provide both sets of data. In addition, in an embodiment wherein either tag is within the tread surface at a suitable depth, the ability or inability to receive a responsive signal from the antenna allows the RFID reader to determine whether the antenna is damaged and thus to detect impending tire failure.

It will be appreciated that various systems and processes for RFID-enabled vehicle navigation assistance have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of monitoring a vehicle location and orientation comprising:
    receiving initial location and orientation data;
    periodically emitting a near field radio frequency (RF) transmission receivable by one or more antennas embedded in one or more tires of the vehicle, the one or more antennas being associated with respective RF transmission circuitry;
    receiving periodically one or more responsive RF transmissions from respective ones of the one or more antennas embedded in the one or more tires;
    periodically calculating vehicle speed and steering angle based on the received one or more responsive RF transmissions; and
    periodically determining a current vehicle location and orientation based on the initial location and orientation data and one or more past calculated vehicle speeds and steering angles.

2. The method in accordance with claim 1 wherein periodically determining a current vehicle location and orientation comprises summing the past calculated vehicle speeds and steering angles with respect to the initial location and orientation data to determine the current vehicle location and orientation.

3. The method in accordance with claim 2 wherein summing the past calculated vehicle speeds and steering angles with respect to the initial location and orientation data comprises summing the past calculated vehicle speeds and steering angles in a turn-by-turn manner.

4. The method in accordance with claim 1 wherein receiving one or more responsive RF transmissions from respective ones of the one or more antennas embedded in the one or more tires further comprises determining a specific tire associated with at least one of the responsive RF transmissions.

5. The method in accordance with claim 1 wherein receiving initial location and orientation data comprises receiving a RF GPS transmission.

6. The method in accordance with claim 1 wherein periodically emitting a near field RF transmission comprises periodically emitting a near field RF transmission from each of a plurality of RF transmitters.

7. The method in accordance with claim 6 wherein the plurality of RF transmitters are located adjacent a respective plurality of the tires of the vehicle.

8. The method in accordance with claim 1 wherein at least one of the one or more antennas is arranged axially within a tread of a tire.

9. The method in accordance with claim 8 wherein calculating vehicle speed comprises counting revolutions of the at least one antenna arranged axially within the tread of a tire based on the received one or more responsive RF transmissions.

10. A system for determining a position and orientation of a vehicle comprising:
 an antenna system including one or more antennas embedded in a respective one or more of a plurality of tires of the vehicle, each antenna being configured to emit a responsive radio frequency (RF) signal when probed by an RF probe signal; and
 a monitoring device comprising an RF transceiver and a processor, the processor being configured to determine an initial position and orientation of the vehicle via externally-referenced data, periodically emit a near field radio frequency transmission receivable by the one or more antennas, receiving periodically one or more responsive radio frequency transmissions from respective ones of the one or more antennas, periodically calculating vehicle speed and steering angle based on the received one or more responsive radio frequency transmissions, and periodically determining a current vehicle location and orientation based on the initial location and orientation data and one or more past calculated vehicle speeds and steering angles.

11. The system in accordance with claim 10 wherein processor is configured to periodically determine the current vehicle location and orientation by summing the past calculated vehicle speeds and steering angles with respect to the initial location and orientation data to determine the current vehicle location and orientation.

12. The system in accordance with claim 11 wherein the processor is configured to sum the past calculated vehicle speeds and steering angles with respect to the initial location and orientation data by summing the past calculated vehicle speeds and steering angles in a turn-by-turn manner.

13. The system in accordance with claim 10 wherein the processor is further configured to determine a specific tire associated with at least one of the responsive radio frequency transmissions.

14. The system in accordance with claim 10 wherein the initial location and orientation data comprises GPS data.

15. The system in accordance with claim 10 wherein the processor is configured to periodically emit a near field radio frequency transmission from each of a plurality of RF transmitters.

16. The system in accordance with claim 15 wherein the plurality of RF transmitters are located adjacent a respective plurality of the tires of the vehicle.

17. The system in accordance with claim 10 wherein at least one of the one or more antennas is arranged axially within a tread of a tire.

18. The system in accordance with claim 17 wherein the processor is configured to calculate vehicle speed by counting revolutions of the at least one antenna arranged axially within the tread of the tire based on the received one or more responsive radio frequency transmissions.

19. A device for determining a position and orientation of a vehicle comprising:
 a radio frequency (RF) transceiver;
 an RF antenna linked to the RF transceiver;
 having a tire with at least one RFID antenna embedded therein, the and
 a processor configured to obtain data indicating an initial vehicle position and vehicle orientation, emit an RF probe signal from the RF antenna via the RF transceiver, the RF probe signal being receivable by at least one RFID antenna embedded in at least one tire of the vehicle, to receive a responsive RF signal from the at least one embedded RFID antenna, to determine a vehicle speed and steering direction based on the responsive RF signal, and determine a current position and orientation of the vehicle based on the initial position and orientation and the determined vehicle speed and steering direction.

20. The device in accordance with claim 19, wherein the at least one RFID antenna includes a first antenna embedded across the tire tread and wherein the data indicating an initial position and orientation is GPS data.

* * * * *